Aug. 18, 1936.  J. MANTELET  2,051,095
MASHER
Filed April 10, 1935
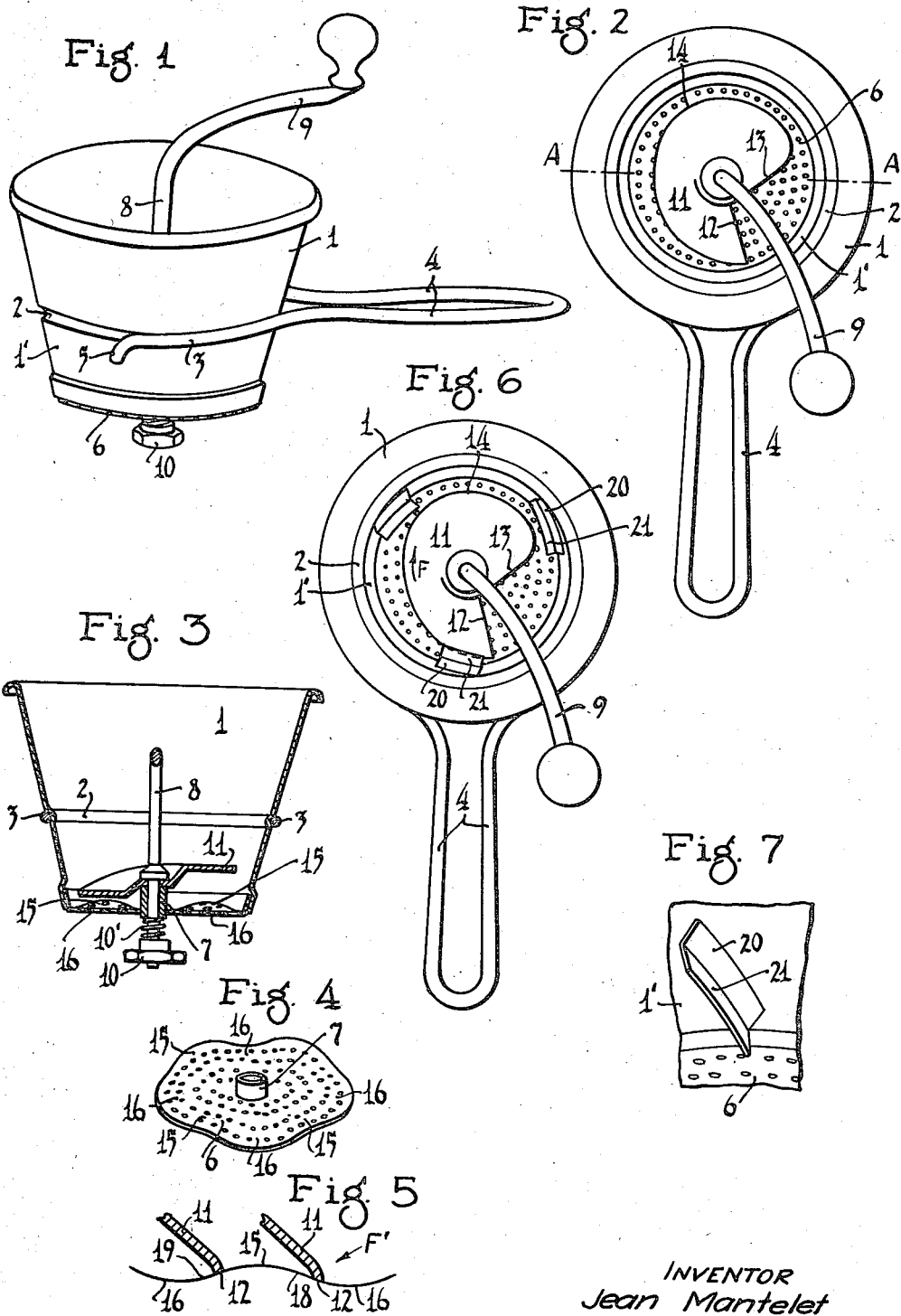
INVENTOR
Jean Mantelet
BY HIS ATTORNEYS Patented Aug. 18, 1936

2,051,095

UNITED STATES PATENT OFFICE 2,051,095

MASHER

Jean Mantelet, Bagnolet, France, assignor to Mantelet & Boucher (Societe en Nom Collectif), Bagnolet, France Application April 10, 1935, Serial No. 15,586
In Luxemburg May 17, 1934

4 Claims. (Cl. 146—175)

My present invention provides an extremely simple and highly efficient masher or pressure sieve adapted to extract the juices from the pulp of juice-producing substances such as vegetables and fruits, and which device may be produced in good commercial form at a minimum of cost. Generally stated, the invention consists of the novel devices, combinations of devices and arrangement of parts hereinafter described and defined in the claims. This device is of the character wherein a helical pressure blade is arranged to work over a perforated sieve, but as an important novel feature, the sieve is formed with undulations wherein an improved and more efficient action is produced.

The invention is illustrated in the accompanying drawing wherein like characters indicate like parts throughout the several views.

Referring to the drawing:

Fig. 1 is a perspective showing the improved masher;

Fig. 2 is a plan view of the masher shown in Fig. 1;

Fig. 3 is a vertical section taken on the line A—A of Fig. 2;

Fig. 4 is a perspective showing bottom-forming screen removed from the container;

Fig. 5 shows schematically the relative positions of the undulated sieve and co-operating helical pressure blade;

Fig. 6 is a view corresponding to Fig. 2, but showing the container provided with additional devices in the nature of knife-acting cleats; and Fig. 7 is a fragmentary perspective showing portions of the sieve container and one of the knife-acting cleats.

The container of the device is preferably in the form of an upwardly flaring cone, which, as shown, is made up of two parts 1 and 1' soldered or otherwise rigidly connected, so as to form a shoulder against which is secured curved forks 3 of a heavy wire handle 4, the ends of the prongs being outwardly and downwardly turned at 5 to better adapt the container to be supported on a pail or utensil, such for example, as a casserole. The bottom 6 of the container is in the form of a disc pierced with holes so as to form a sieve. This sieve-forming bottom, as illustrated, is formed separately from the container but might be an integral part thereof. The novel form of this sieve bottom will later be discussed. At its center, it is provided with a sleeve-like hub or bearing 7 through which is extended a downturned axle 8 of a crank-like handle 9. This axle 8 is held in position and yieldingly pressed downward by a nut 10 applied to the threaded lower end thereof and by a spring 10' interposed between said nut and the bearing 7.

The axle 8 is passed through and rigidly secured to the helical pressure blade 11, the lower and radially long edge of this helical blade being downwardly turned at 12 for direct and constant contact with the upper surface of the sieve 6. The under surface of this helical blade is formed to gradually increase its elevation above the sieve in the direction of rotation, to wit: the direction of the arrow marked F on Figs. 2 and 6. The raised and radially shorter edge of the blade 11 is indicated by the numeral 13 and the helical edge of said blade is indicated by the numeral 14.

As already indicated, the sieve 6 has a plurality of undulations, as shown four in number, and each of these undulations form a projection or raised crown 15 and a groove or valley 16, both of which radiate from the axis of the sieve and from the axis of rotation of the blade. In the undulations thus formed, the ascending slopes are indicated at 18 and the descending slopes at 19. With this arrangement, under rotation of the pressure blade 11, its edge 12 will maintain constant contact with the undulated surface of the sieve. Of course, the extent to which the undulations in the sieve deviate from a plane surface may be varied but should be sufficient to make an appreciable difference between the scraping action produced by the blade on the ascending and on the descending sides of the undulations. In Fig. 5, the extent of the undulations is exaggerated beyond the necessity found in actual practice.

Referring to this illustrative Fig. 5, it will be obvious that the pulp or material will be compressed to the greatest extent while the edge 12 of the blade 11 is moving on an ascending surface of the undulations, and that it will be subjected to least pressure while the blade is moving on the descending side of the undulation. This alternates the maximum and minimum pressure applied to the material, and as has been demonstrated in practice, greatly increases the efficiency of the screening action. By the said action, the material while compressed, shifts its position both vertically and in the direction of rotation of the blade and is subjected intermittently to an alternative increasing and decreasing substantially direct downward pressure. Otherwise stated, the action is not a uniform continuous forward scraping action which has more of a tendency of causing the material to travel on the screen than to be pressed through the screen.

The spring 10' performs the important function of keeping the lower edge of the blade in contact with the sieve while it is moving over the undulating surface thereof.

The efficiency of this device has been thoroughly demonstrated in commercial practice.

As above stated, the structure illustrated in Figs. 6 and 7 is like that illustrated in Figs. 1 to 5, inclusive, except that the knife-acting cleats are shown as applied and rigidly secured to the interior of the container. As shown, these cleats 20 are angular in cross-section and obliquely set with their flanges 21 projecting inward and in such position that their lower ends are spaced from the sieve enough to permit the passage of the outer end of the long arm 12 of the blade 11 to pass under the same. These cleats hold back the pulp, that is, prevent the same from intercepting rotation thereof with the blade, and as the blade forces the material under the same, having a cutting or scraping action.

What I claim is:

1. A device of the kind described comprising a container, the bottom of which is an undulated sieve forming alternated crowns and valleys that radiate from the axis thereof, and a rotary presser blade having a radial scraping edge movable over the undulated surface of said sieve.

2. A device of the kind described comprising a container, the bottom of which is an undulated sieve forming alternated crowns and valleys that radiate from the axis thereof, a rotary presser blade having a radial scraping edge movable over the undulated surface of said sieve, and a resilient element operative on said blade to maintain engagement of the scraping edge thereof with said undulated surface under rotation of said blade.

3. A device of the kind described comprising a container, the bottom of which is an undulated sieve forming alternated crowns and valleys that radiate from the axis of said sieve, and a handle-equipped rotary presser blade having a depending or scraping edge and also having a depending axle journaled at the axis of said sieve and extended therethrough and provided at its lower end with a nut and a yielding element interposed between said nut and sieve, the latter serving to yieldingly hold the scraping edge of said blade in contact with the undulated surface of said sieve under rotation of the latter.

4. The structure defined in claim 1 in which said undulated sieve is in the form of a perforated metal plate, the upper undulated surface of which is smooth.

JEAN MANTELET.